United States Patent
Wilson et al.

(10) Patent No.: US 11,311,439 B2
(45) Date of Patent: Apr. 26, 2022

(54) MANUAL LIFT SYSTEM FOR BED POWER ASSIST WHEEL

(71) Applicant: Huntleigh Technology Limited, Dunstable (GB)

(72) Inventors: Kevin Wilson, San Antonio, TX (US); Thomas Anthony Dellaca, San Antonio, TX (US)

(73) Assignee: Huntleigh Technology Limited, Bedfordshire (GB)

( * ) Notice: Subject to any disclaimer, the term of this patent is extended or adjusted under 35 U.S.C. 154(b) by 458 days.

(21) Appl. No.: 16/081,518

(22) PCT Filed: Mar. 1, 2017

(86) PCT No.: PCT/US2017/020275
§ 371 (c)(1),
(2) Date: Aug. 31, 2018

(87) PCT Pub. No.: WO2017/151817
PCT Pub. Date: Sep. 8, 2017

(65) Prior Publication Data
US 2019/0209406 A1    Jul. 11, 2019

Related U.S. Application Data

(60) Provisional application No. 62/301,928, filed on Mar. 1, 2016.

(51) Int. Cl.
*A61G 7/08* (2006.01)
*B60B 33/06* (2006.01)
(Continued)

(52) U.S. Cl.
CPC .............. *A61G 7/08* (2013.01); *A61G 1/0268* (2013.01); *A61G 1/0275* (2013.01);
(Continued)

(58) Field of Classification Search
CPC ...... A61G 7/08; A61G 7/0528; A61G 1/0268; A61G 1/0275; A61G 1/0237; A61G 1/025;
(Continued)

(56) References Cited

U.S. PATENT DOCUMENTS 3,156,493 A * 11/1964 Griffiths ................ E05C 19/022
                                                                  292/164
5,090,070 A *  2/1992 Heinz .................. A61G 7/0509
                                                                     5/313.1
(Continued)

FOREIGN PATENT DOCUMENTS

DE        102004024178 A1    12/2005

*Primary Examiner* — Peter M. Cuomo
*Assistant Examiner* — Morgan J McClure
(74) *Attorney, Agent, or Firm* — The Webb Law Firm

(57) ABSTRACT

A lift mechanism for a wheel assembly includes a lever arm having a first axis of rotation, and a first torque transfer plate having a second axis of rotation coincident with the first axis of rotation. A lift block is engageable by the first torque transfer plate and has a first angularly disposed surface and a resting surface adjacent to the first angularly disposed surface. The lift mechanism is configured such that rotation of the lever arm causes the first torque transfer plate to rotate into engagement with the lift block, thereby causing linear motion of the lift block. The wheel assembly is raised and lowered by contact between a portion of the wheel assembly and the first angularly disposed surface of the lift block and held in a raised position when the portion of the wheel assembly is positioned with respect to the resting surface.

16 Claims, 13 Drawing Sheets

(51) Int. Cl.
*A61G 7/05* (2006.01)
*A61G 1/02* (2006.01)

(52) U.S. Cl.
CPC ............ *A61G 7/0528* (2016.11); *B60B 33/06* (2013.01); *B60B 33/063* (2013.01); *B60B 33/066* (2013.01)

(58) Field of Classification Search
CPC .. A61G 1/0293; A61G 1/0256; A61G 1/0262; B60B 2200/24; B60B 2200/242; B60B 33/04; B60B 33/06; B60B 33/066; B60B 33/063; A47C 7/006
See application file for complete search history.

(56) References Cited

U.S. PATENT DOCUMENTS

| | | | | |
|---|---|---|---|---|
| 5,348,326 | A * | 9/1994 | Fullenkamp | A61G 7/00 280/43 |
| 5,474,311 | A * | 12/1995 | Tyciak | B60N 2/01591 280/30 |
| 5,806,111 | A * | 9/1998 | Heimbrock | A61G 1/0225 280/47.371 |
| 6,230,343 | B1 * | 5/2001 | Buiskool | A61G 7/012 5/610 |
| 6,256,812 | B1 * | 7/2001 | Bartow | A61G 7/00 280/43.17 |
| 6,598,247 | B1 * | 7/2003 | Heimbrock | A61G 7/08 296/20 |
| 6,725,956 | B1 * | 4/2004 | Lemire | A61G 7/08 180/15 |
| 7,311,161 | B2 * | 12/2007 | Lee | A61G 7/08 180/11 |
| 7,896,366 | B2 * | 3/2011 | Campbell | B60B 33/063 280/43.17 |
| 8,365,354 | B1 * | 2/2013 | Fan | B60B 33/04 16/35 R |
| 8,632,045 | B2 * | 1/2014 | Ma | A45B 23/00 248/519 |
| 8,746,710 | B2 * | 6/2014 | Schejbal | A61G 7/08 280/43.23 |
| 9,132,053 | B1 * | 9/2015 | Ferreri | A61G 13/104 |
| 9,579,241 | B2 * | 2/2017 | Spoor | B62B 9/082 |
| 9,918,888 | B2 * | 3/2018 | Boggs | A61G 7/05 |
| 10,603,236 | B2 * | 3/2020 | Kottmann | B62B 3/10 |
| 2003/0159861 | A1 * | 8/2003 | Hopper | A61G 1/0268 180/22 |
| 2004/0139545 | A1 * | 7/2004 | Reinke | B60B 33/0021 5/86.1 |
| 2005/0172403 | A1 * | 8/2005 | Darling | A47C 19/045 5/509.1 |
| 2007/0170673 | A1 * | 7/2007 | Figel | B60B 33/0057 280/47.34 |
| 2008/0229545 | A1 * | 9/2008 | Duvert | B60B 33/0089 16/35 R |
| 2010/0088846 | A1 * | 4/2010 | Salus | B60B 33/0023 16/34 |
| 2014/0299826 | A1 * | 10/2014 | March | B62B 5/0079 254/2 R |

* cited by examiner

MANUAL LIFT SYSTEM FOR BED POWER ASSIST WHEEL

CROSS-REFERENCE TO RELATED APPLICATIONS

This application is the United States national phase of International Application No. PCT/US2017/020275 filed Mar. 1, 2017, and claims priority to U.S. Provisional Patent Application No. 62/301,928 filed on Mar. 1, 2016, the disclosures of Which are hereby incorporated by reference in their entirety.

TECHNICAL FIELD

The presently disclosed embodiments are directed to a carrier, e.g., a hospital bed, more particularly to a carrier having at least one power driven wheel attached to the carrier, and even more particularly to a manual lifting system to raise and lower at least one power driven wheel when power is not available or used.

BACKGROUND

Patients and individuals are often required to remain in a carrier, e.g., a hospital bed, for extended periods of time. Care givers must then be able to move the patients or individuals about a facility, e.g., hospital, nursing home, etc., in order to provide various needed services, such as medical procedures, diagnostic procedures, overall care, or simply to afford the patients an opportunity to spend time in a different location. Moving a carrier may be a difficult action as the care giver must not only move a large object on swiveling wheels mounted therebelow, i.e., the carrier, but the carrier also includes a patient which could range in weight from a child (40 pounds) to a large adult (500 pounds or more). In order to assist care givers with movement of carriers, some carriers include power driven wheels that may be turned on or off as needed. Although the powered wheels provide added forwardly directed force, the same wheel assemblies may also provide resistance to movement under certain circumstances, e.g., when the wheels are unpowered.

For example, the powered wheels include some form of a power supply (e.g., battery) as it is not possible to maintain a wired connection between a carrier and a fixed power source in a facility as the carrier is moved about the facility. When the power in the power supply drops below a suitable power level (e.g., the battery is drained), the motor or actuator driving the powered wheels can no longer operate. In fact, a motor or other actuator itself may act as a braking system precluding or hindering forward movement. Thus, in order to continue to move the carrier after loss of power occurs, the powered wheels are be disengaged, e.g., lifted to eliminate any contact with the ground or floor.

Manual systems to raise power driven wheels off the ground or floor are known in the art, see, e.g., U.S. Pat. No. 7,311,161; however, such systems are complex, inefficient and/or suffer from other drawbacks. For example, the hospital bed disclosed in U.S. Pat. No. 7,311,161 includes a long lever having a screw type lifting system thereon. The system is inefficient and may be impractical for lifting some powered wheel assemblies due to the amount of rotational force required to impart the necessary upward movement to the powered wheel assembly.

The present disclosure addresses a system and method for efficiently and effectively raising and lowering a power driven wheel assembly on a carrier.

SUMMARY

An exemplary embodiment of a wheel assembly lift mechanism of the present application may include a lever arm comprising a first axis of rotation, a first torque transfer plate comprising a second axis of rotation coincident with the first axis of rotation, and a lift block engagable by the first torque transfer plate, the lift block having a first angularly disposed surface and a resting surface adjacent to the first angularly disposed surface, wherein the lift mechanism is configured such that rotation of the lever arm causes the first torque transfer plate to rotate into engagement with the lift block, thereby causing linear motion of the lift block, and the wheel assembly is raised and lowered by contact between a portion of the wheel assembly and the first angularly disposed surface of the lift block and held in a raised position when the portion of the wheel assembly is positioned with respect to the resting surface.

In one embodiment, any lift mechanism or bed disclosed herein may include a lever arm having a first end and a second end and the first axis of rotation is closer to the second end than to the first end. The first torque transfer plate may be integrally formed with the lever arm. The first torque transfer plate may have a first slot including an open end and a closed end, wherein the open end is distal relative to the second axis of rotation. In one embodiment, the first torque transfer plate may also be configured as a torque transfer fork.

In one exemplary embodiment, any lift mechanism or bed disclosed herein may include a second torque transfer plate comprising the second axis of rotation, where the lever arm causes the first and second torque transfer plates to rotate into engagement with a lift block, thereby inducing linear motion of the lift block. The lift block may have a second angularly disposed surface positioned at an edge of the first angularly disposed surface opposite the resting surface. In one embodiment, the first angularly disposed surface may include a first angle relative to a projection of the resting surface, and the second angularly disposed surface may include a second angle relative to a projection of the resting surface, where the first angle is less than the second angle. The first torque transfer plate may include a first slot and the lift block may include a pin that is positioned within the first slot. The pin may include a first longitudinal axis parallel to the first and second axes of rotation.

An exemplary embodiment of a bed of the present application may include a frame, a driven wheel secured to the frame and comprising a lift bearing, and a lift mechanism secured to the frame and including a lever arm comprising a first axis of rotation, a first torque transfer plate comprising a second axis of rotation coincident with the first axis of rotation, and a lift block comprising a first pin engagable by the first torque transfer plate, a first angularly disposed surface and a resting surface adjacent to the first angularly disposed surface, wherein the lift mechanism is configured such that rotation of the lever arm causes the first torque transfer plate to rotate into engagement with the pin, thereby causing linear motion of the lift block, the wheel raised and lowered by contact between the lift bearing and the first angularly disposed surface of the lift block.

In one embodiment, any bed disclosed herein may include a frame having at least three wheel assemblies positioned at a common elevation relative to each other. The driven wheel may be positioned at the common elevation when in a lowered position, and the driven wheel may be positioned elevationally higher than the common elevation when in a raised position. The driven wheel may include a driving motor.

In one embodiment, any bed disclosed herein may include a second torque transfer plate comprising the second axis of rotation, wherein rotation of the lever arm causes rotation of the first and second torque transfer plates to rotate into engagement with the pin, thereby causing linear motion of the lift block. The lift block may include a second angularly disposed surface positioned at an edge of the first angularly disposed surface opposite the resting surface. The first angularly disposed surface may include a first angle relative to a projection of the resting surface, and the second angularly disposed surface may include a second angle relative to a projection of the resting surface, where the first angle is less than the second angle. In one embodiment, the first torque transfer plate may include a first slot and the first pin may be positioned within the first slot.

An exemplary embodiment of a bed of the present application may include a frame, a first driven wheel secured to the frame and comprising a first lift bearing, a second driven wheel secured to the frame and comprising a second lift bearing, and a lift mechanism secured to the frame. The frame including a lever arm comprising a first axis of rotation, a rotatable shaft comprising a longitudinal axis coincident with the first axis of rotation, the rotatable shaft is secured to the lever arm, a first torque transfer plate comprising a second axis of rotation coincident with the first axis of rotation, the first torque transfer plate is secured to the rotatable shaft, a second torque transfer plate comprising a third axis of rotation coincident with the first axis of rotation, the second torque transfer plate is secured to the rotatable shaft, a first lift block comprising a first pin engagable by the first torque transfer plate, a first angularly disposed surface and a first resting surface adjacent to the first angularly disposed surface, and a second lift block comprising a second pin engagable by the second torque transfer plate, a second angularly disposed surface and a second resting surface adjacent to the second angularly disposed surface, wherein the lift mechanism is configured such that rotation of the lever arm causes the first and second torque transfer plates to rotate into engagement with the pin, thereby causing linear motion of the first and second lift blocks, respectively, the first and second wheels raised and lowered by contact between the first lift bearing and the first angularly disposed surface of the first lift block and the second lift bearing and the second angularly disposed surface of the second lift block, respectively.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
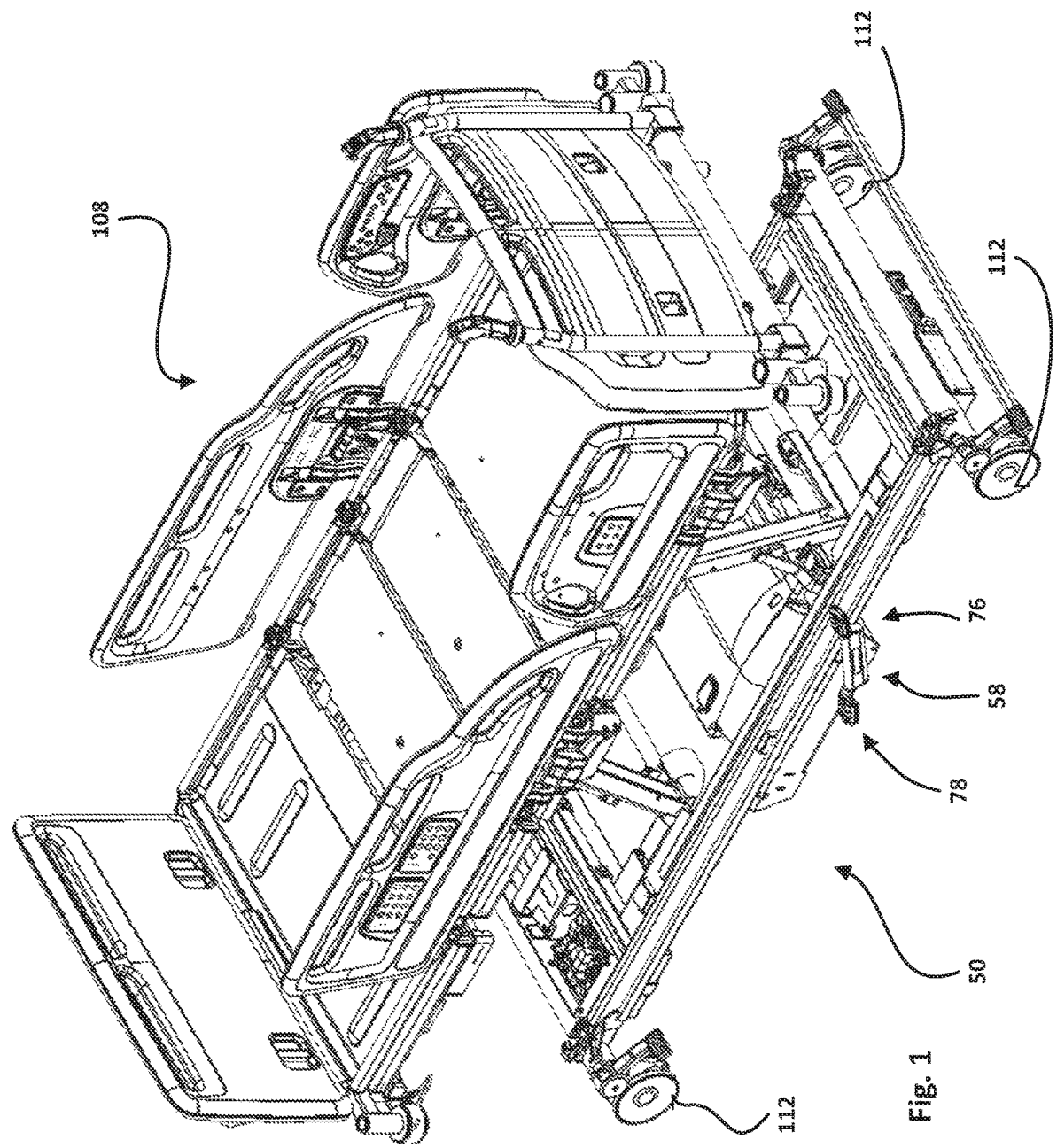
FIG. 1 is a top perspective view of an embodiment of a present lift mechanism arranged on a carrier, i.e., arranged in FIG. 1 as a hospital bed.
Figure 2:
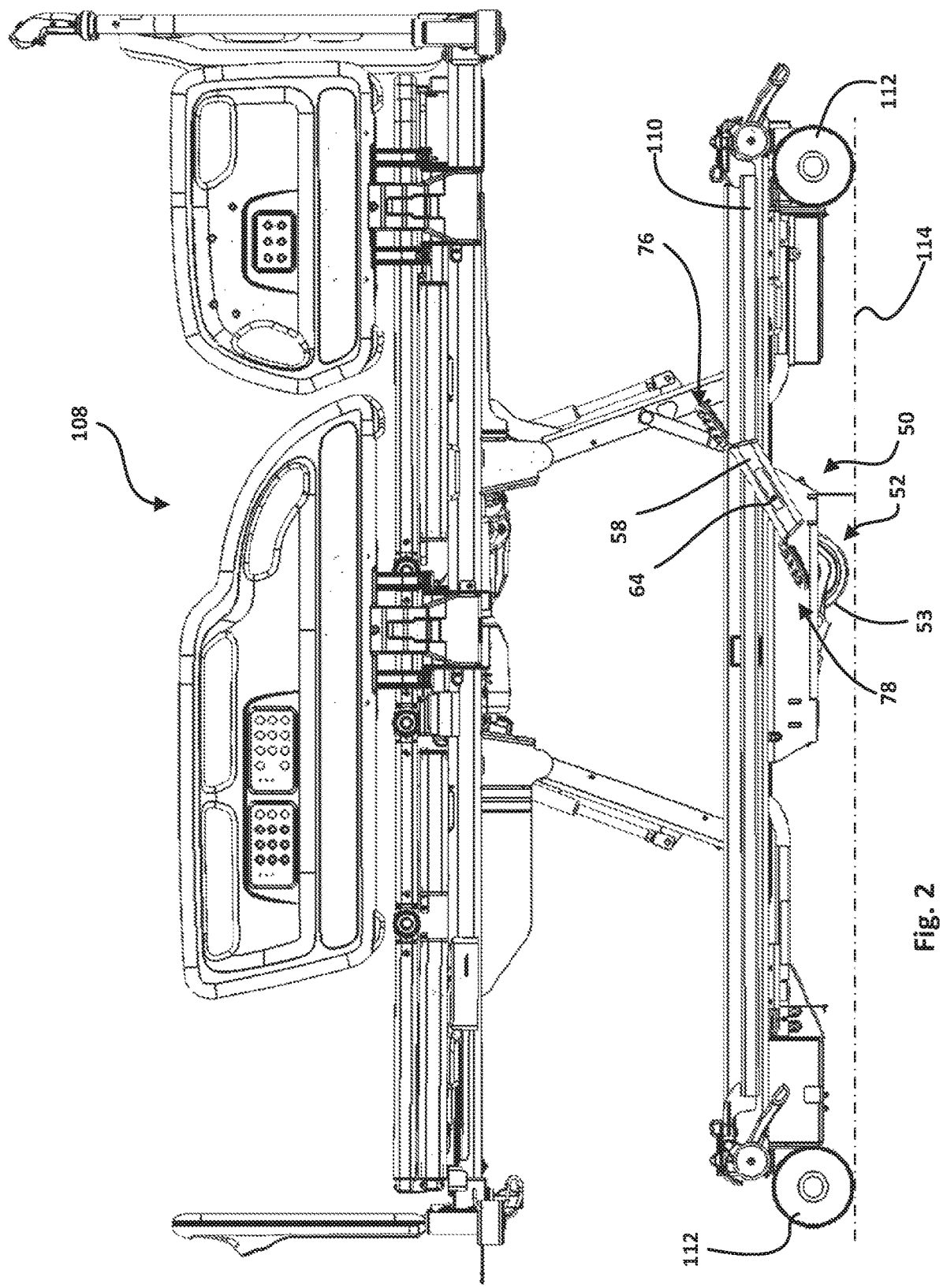
FIG. 2 is a side elevational view of the present lift mechanism arranged on the carrier depicted in FIG. 1.
Figure 3:
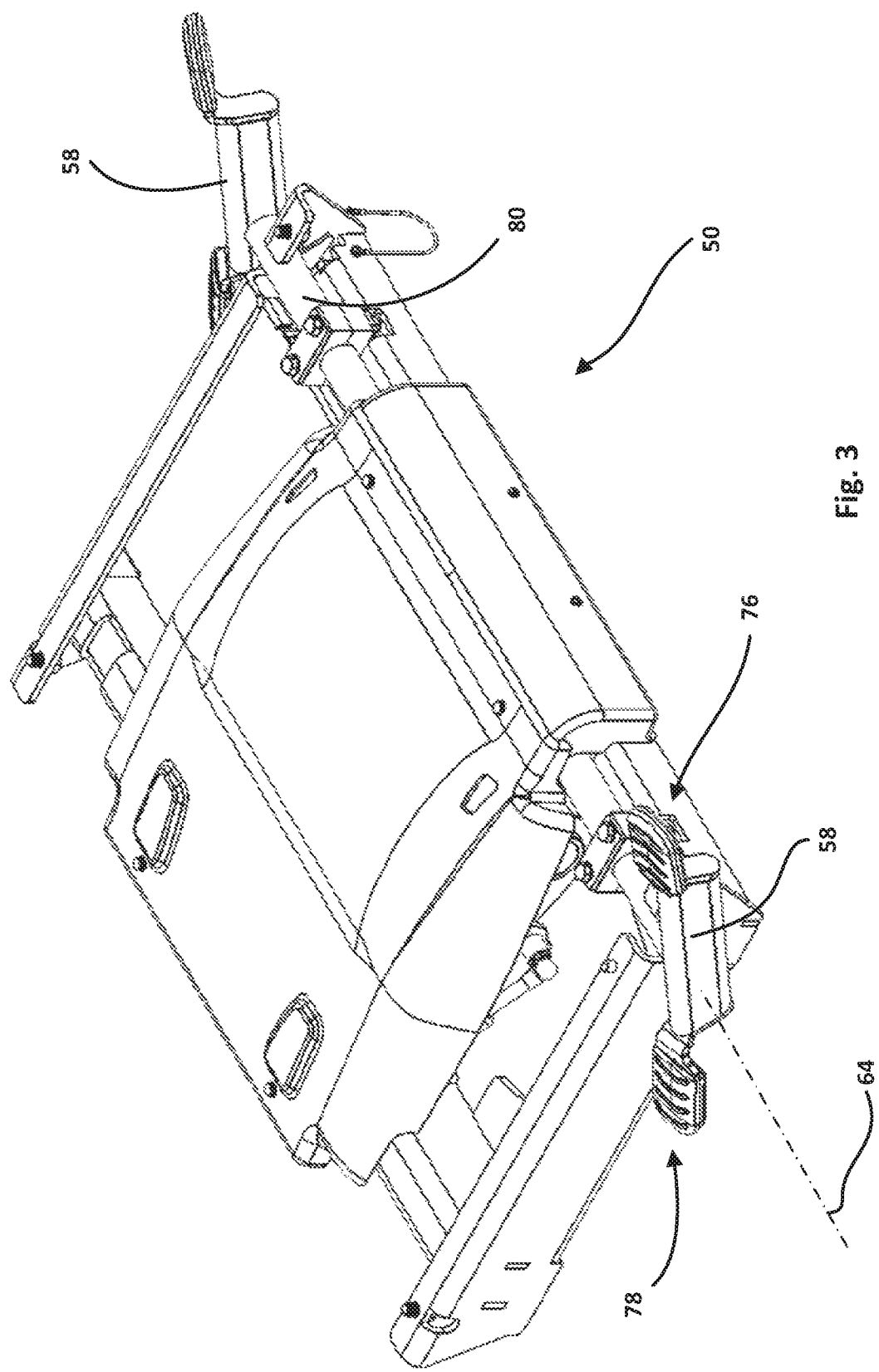
FIG. 3 is a top perspective view of an embodiment of a present lift mechanism.
Figure 4:
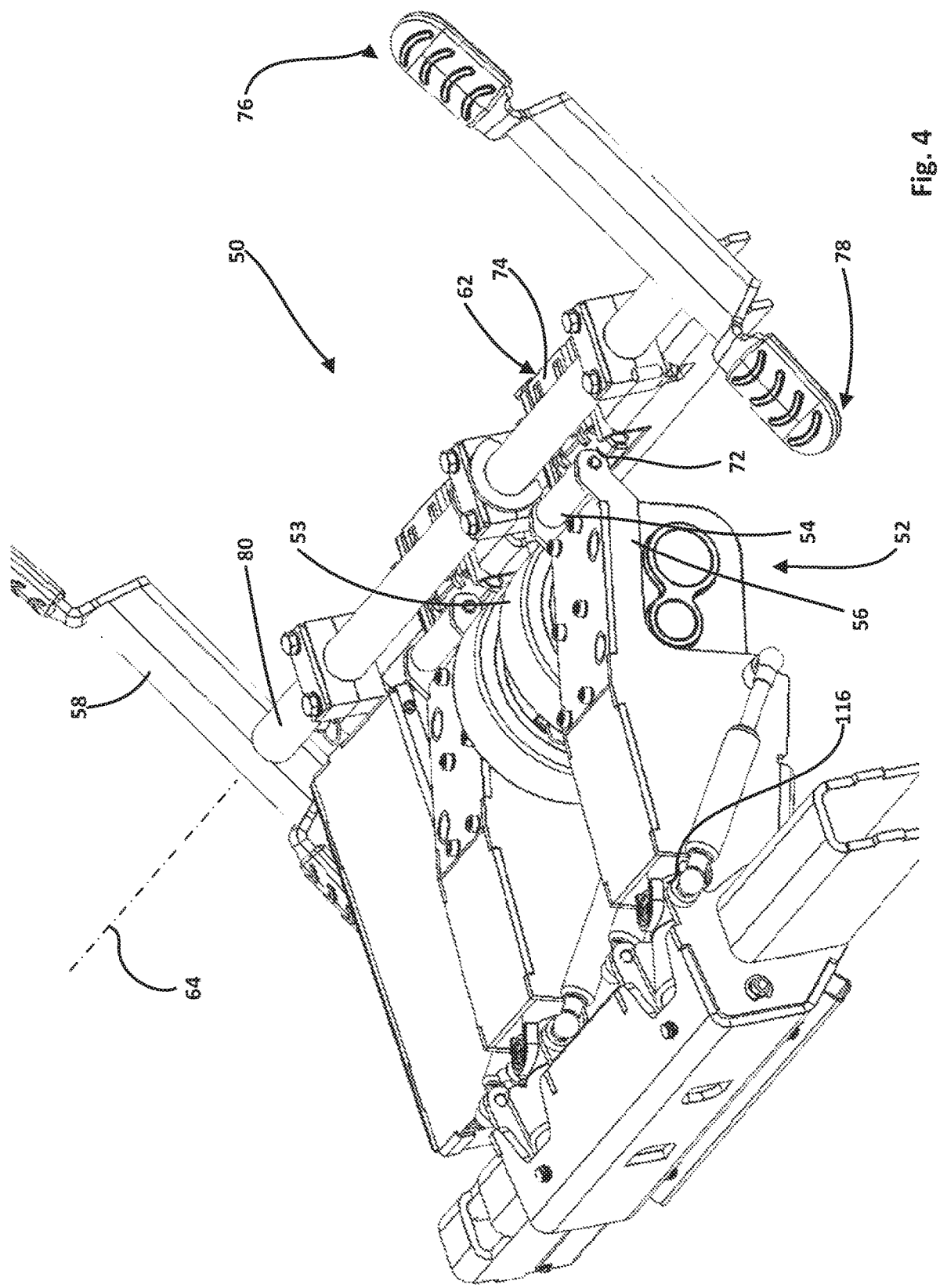
FIG. 4 is a top perspective view of an embodiment of a present lift mechanism with outer cover removed for clarity.
Figure 5:
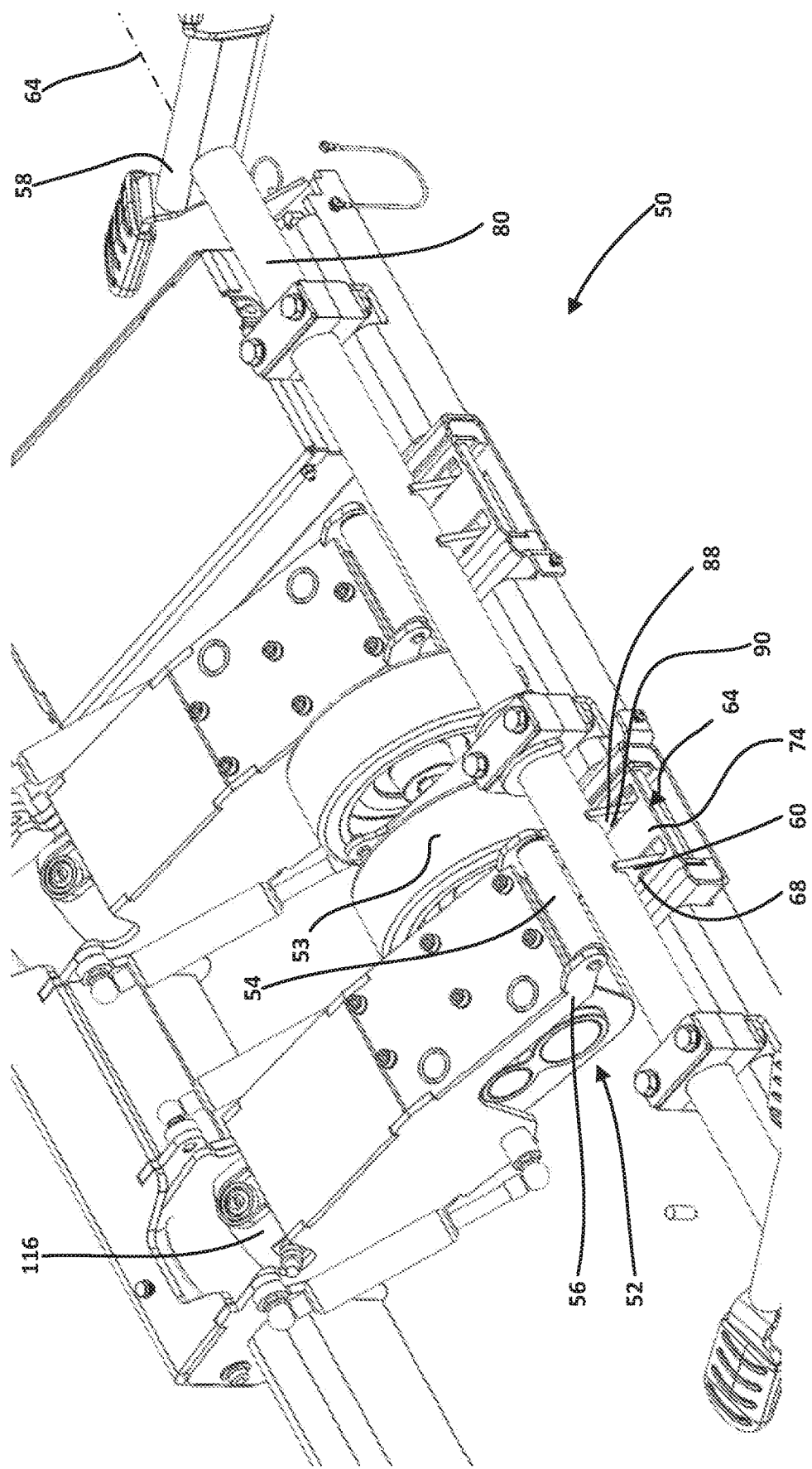
FIG. 5 is a top perspective an embodiment of a present lift mechanism with outer cover removed for clarity.
Figure 6:
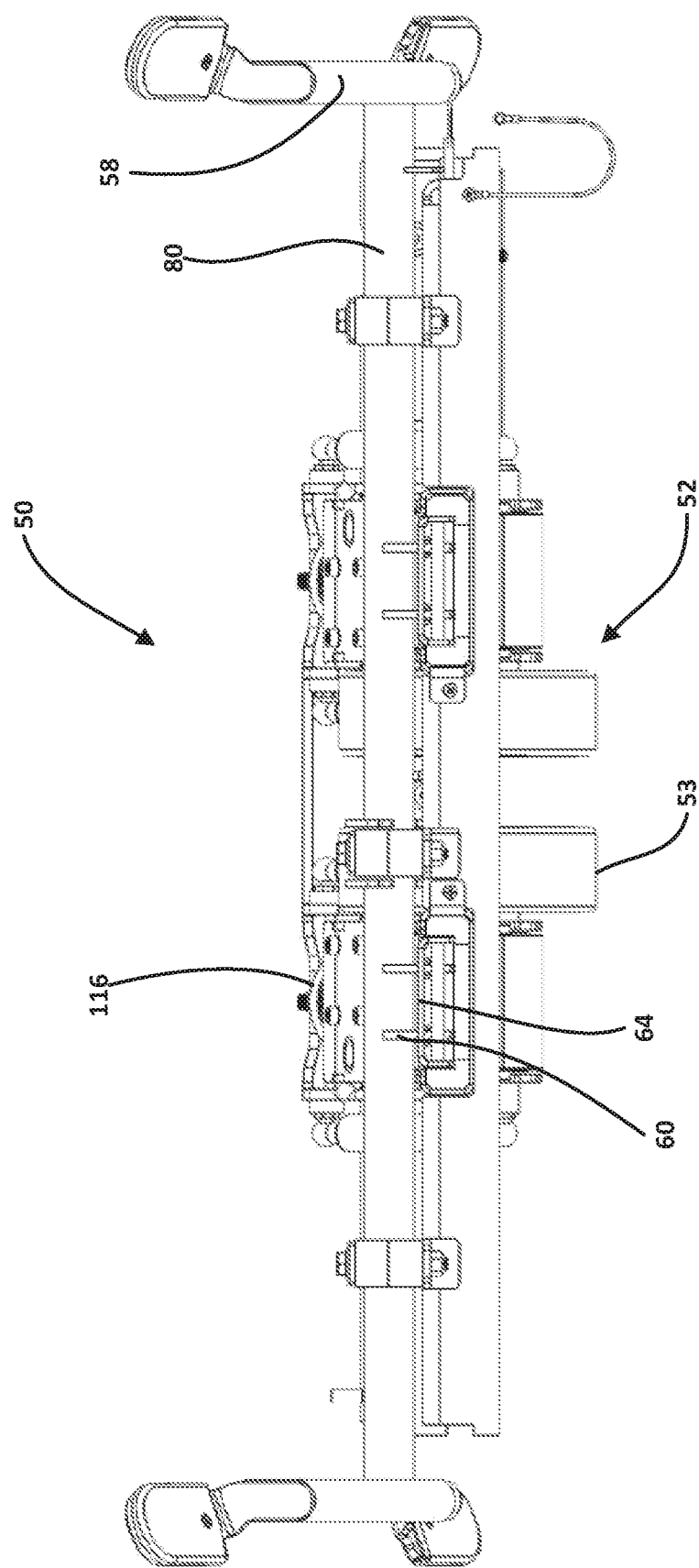
FIG. 6 is a rear elevational view of an embodiment of a present lift mechanism with outer cover removed for clarity.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "element A integrally formed with element B" or "element A is integral with element B", and other variations thereof, are intended to be broadly construed as meaning elements A and B are parts that form a whole, or in other terms, together elements A and B form a single continuous structure. Furthermore, terms related to directions and orientations, e.g., up, down, horizontal, vertical, etc., are included for purposes of illustration and are generally with respect to the accompanying figures. Use of such terms is not intended to limit the scope of any claims included herein.

It should be understood that the use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

Broadly, the system comprises a rotating member which has a lever used by an operator to induce a torque on the rotating member. The induced torque is then transferred to a linear motion which biases one or more lift blocks towards and eventually under lift bearings associated with the power driven wheel suspension arm and thereby the wheels. The blocks are designed with an incline plane at the leading edge which transforms the horizontal movement to a vertical movement of the suspension arm away from the floor.

Figure 7:
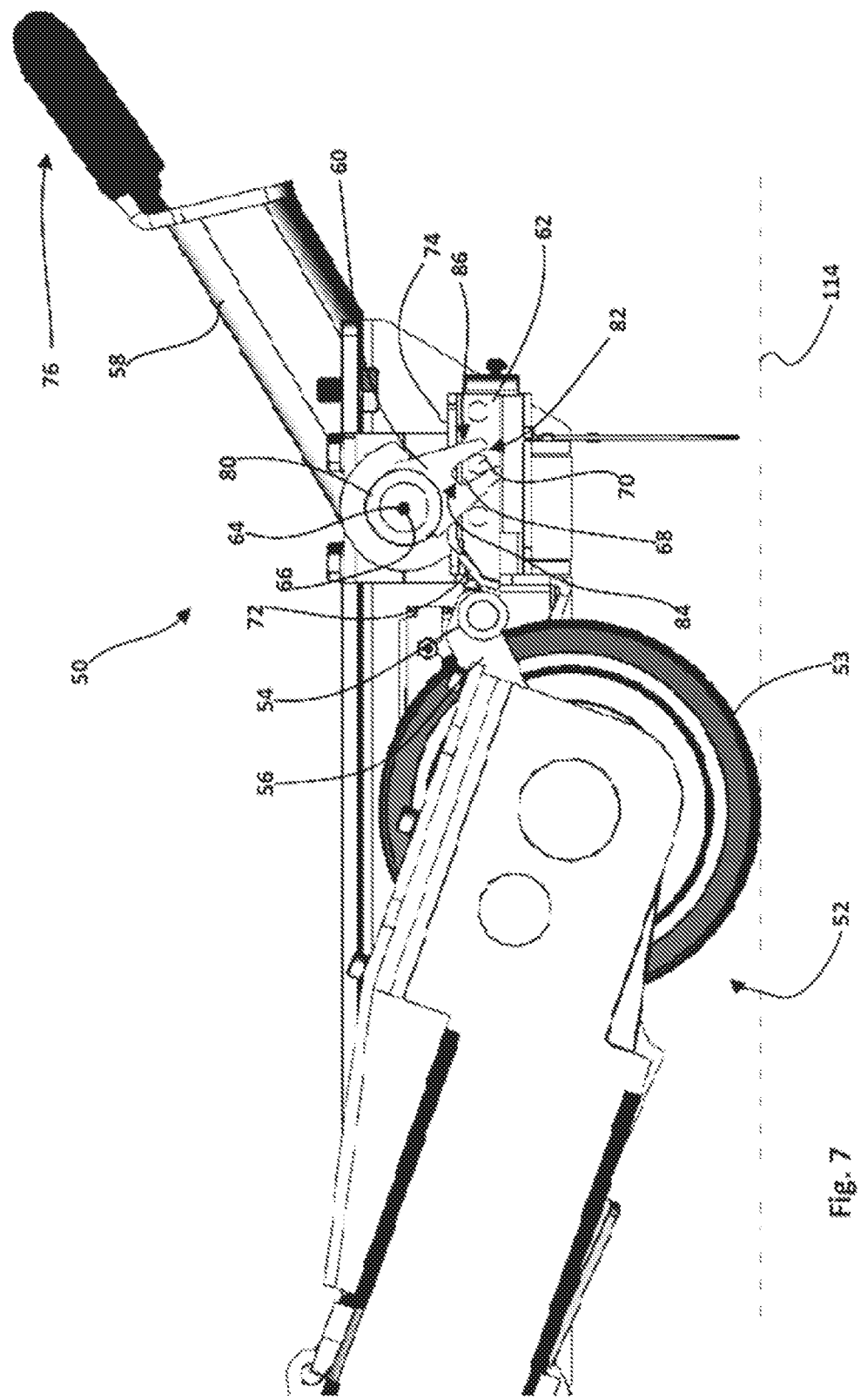
FIG. 7 is a partial cross sectional view of an embodiment of a present lift mechanism shown with a driven wheel in a lowered position.
Figure 8:
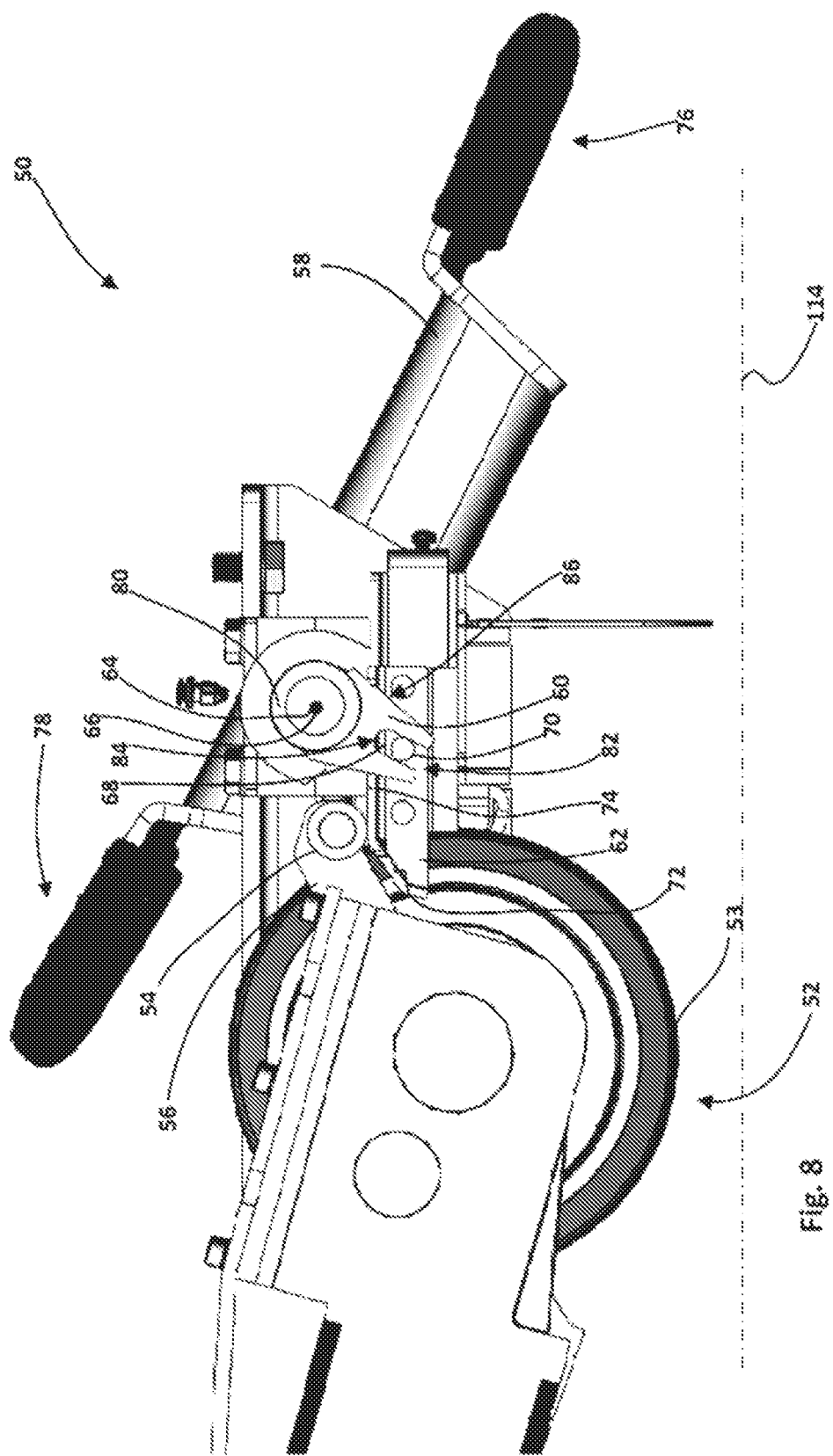
FIG. 8 is a partial cross sectional view of an embodiment of a present lift mechanism shown with a driven wheel in a raised position.

The present disclosure sets forth various embodiments of a lift mechanism for a wheel or wheel assembly. Lift mechanism 50 is arranged to raise and lower wheel assembly 52. Wheel assembly 52 comprises wheel 53 and lift bearing 54, which bearing 54 is connected to wheel 53 via any suitable means, e.g., suspension arm 56. Lift mechanism 50 comprises lever arm 58, torque transfer plate 60, and lift block 62. Lever arm 58 comprises axis of rotation 64. Torque transfer plate 60 comprises axis of rotation 66 and slot 68. Lift block 62 comprises pin 70, angularly disposed surface 72, and resting surface 74 adjacent to angularly disposed surface 72. Axis of rotation 64 is coincident with axis of rotation 66. The rotation of lever arm 58 causes rotation of torque transfer plate 60, which in turn causes linear motion of lift block 62. Wheel assembly 52 is raised and lowered by contact between lift bearing 54 and lift block 62. For example, wheel assembly 52 is raised when lift block 62 moves towards lift bearing 54 and lift bearing 54 moves upwardly along angularly disposed surface 72. (See, FIG. 8). Contrarily, wheel assembly 52 is lowered when lift block 62 moves away from lift bearing 54 and lift bearing 54 moves downwardly along angularly disposed surface 72. (See, FIG. 7).

Lift bearing 54 is arranged to rest on resting surface 74 when wheel assembly 52 is moved by lift mechanism 50 to its raised or lifted position. Resting surface 74 may be generally horizontal in arrangement, as in the illustrated embodiments. It is to be appreciated that a downward force on resting surface 74, e.g., due to weight of wheel assembly 52, is generally perpendicular to the direction of motion of the lift block 62, and will therefore not result in horizontal motion of the lift block 62, and thus accidental lowering of wheel assembly 52 is prevented regardless of the weight of wheel assembly 52. Advantageously, a downward force by lift bearing 54 on resting surface increases the friction therebetween, thereby resisting relative horizontal movement of lift block 62 and assisting in holding wheel assembly 52 in its raised position after being lifted by lift mechanism 50. In some embodiments, resting surface 74 may be arranged to further assist in locking or holding wheel assembly 52 in its raised configuration. For example, resting surface 74 may include a dent, divot, or recess sized and/or shaped to receive lift bearing 54, or resting surface 74 may be downwardly sloped in a direction away from wheel assembly 52, in order to increase a force required to disengage lift bearing 54 from resting surface 74.

Lever arm 58 comprises first end 76 and second end 78. Since ends 76 and 78 are oppositely disposed with respect to axis of rotation 64, depressing one end will cause the other end to raise. In this way, first end 76 may be arranged, as illustrated, to lift wheel assembly 52 upon depressing first end 76, which also causes second end 78 to rise. Thereafter depressing the second end 78 will reset lift mechanism 50 by again lowering wheel assembly 52 and returning first end 76 to its original raised orientation. If located proximate to the floor, lever arm 58 may be conveniently actuated by a user stepping on the relevant end of lever arm 58. In some embodiments, axis of rotation 64 is closer to second end 78 than to first end 76, such that one side of the lever arm is longer than the other and increased mechanical advantage is obtained by actuating lever arm 58 at the longer side having first end 76 rather than at the shorter side having second end 78. In other words, the foregoing embodiments require less force to raise or lift wheel assembly 52 than embodiments where axis of rotation 64 is closer to first end 76 than second end 78. In this way, since it takes a greater force to raise wheel assembly 52 than to lower wheel assembly 52 (as lifting opposes gravity and lowering is assisted by gravity), lever arm 58 may be arranged such that depressing lever arm 58 at first end 76 corresponds to raising wheel assembly 52 with the increased mechanical advantage provided by the relatively lower side of the lever arm 58, while depressing lever arm 58 at second end 78 corresponds to lowering wheel assembly 52. In one embodiment, the lever arm 58 only has one end and lowering the wheel assembly is accomplished by pressing up on the lever arm from beneath, e.g., pressing up on lever arm 58 with the top of a user's foot.

In some embodiments, torque transfer plate 60 is integrally formed with or directly attached to lever arm 58, while in other embodiments, lever arm 58 is secured to rotatable shaft 80 to which torque transfer plate 60 is attached. In some embodiments, slot 68 comprises open end 82 and closed end 84, i.e., an open slot arrangement. Open end 82 is distal relative to axis of rotation 66. Torque transfer plate 60 may be a torque transfer fork, e.g., fork 86, or torque transfer plate 60 may take alternate forms, e.g., a plate comprising a closed slot, or any other finger, projection, or other element extending radially away from axis of rotation 64 and capable of transferring force due to rotation thereof about axis of rotation 64. Moreover, alternate means of transferring rotational movement of shaft 80 to lift block 62 may also be used. For example, shaft 80 may include a splined segment or attached gear, i.e., a pinion, which interacts with a rack on lift block 62. In such embodiments, each tooth or spline would in effect create a torque transfer plate as described herein. Thus, rotation of shaft 80 would be transformed to linear motion of lift block 62 by the interaction between the rack and pinion. Such arrangements and others appreciable to those of ordinary skill in the art by the instant disclosure fall within the scope of the claims below.

In some embodiments, lift mechanism 50 further comprises additional torque transfer plates, e.g., torque transfer plate 88 which comprises axis of rotation 66 and slot 90. In these embodiments, rotation of lever arm 58 causes rotation of torque transfer plates 60 and 88 thereby causing linear motion of lift block 62. Any number of torque transfer plates may be included, e.g., in order to reduce the counter force exerted from a lift block on any given torque transfer plate and/or to actuate any number of separate and/or individually actuatable lift blocks.

Figure 9:
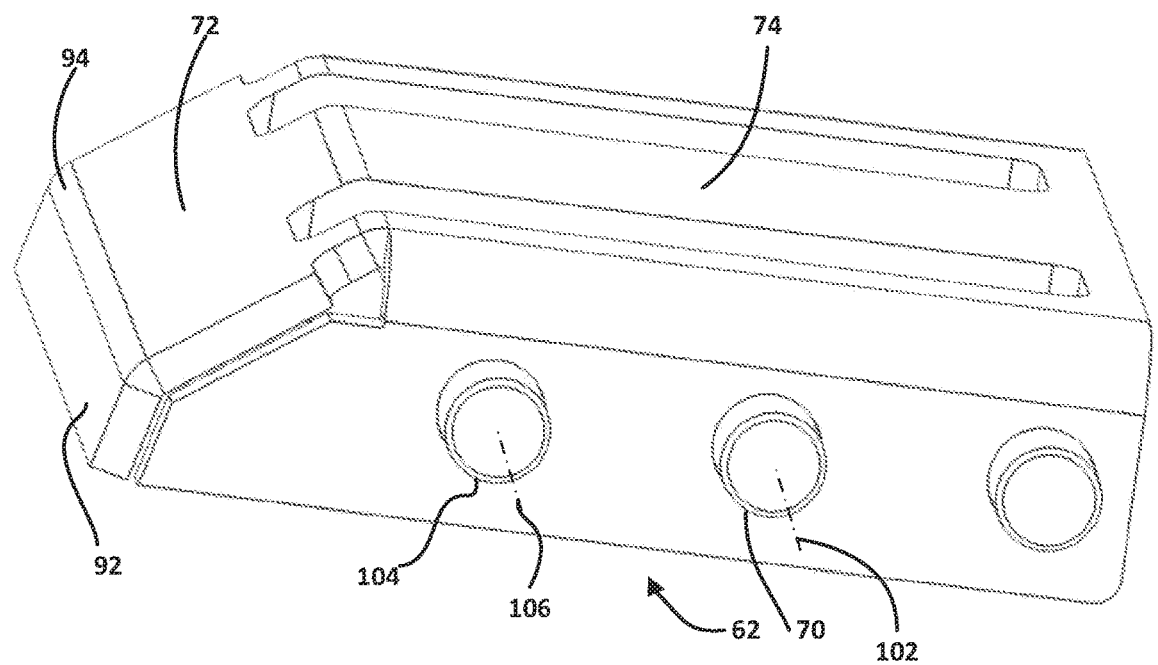
FIG. 9 is a perspective view of an embodiment of a lift block used in some embodiments of a present lift mechanism.
Figure 10:
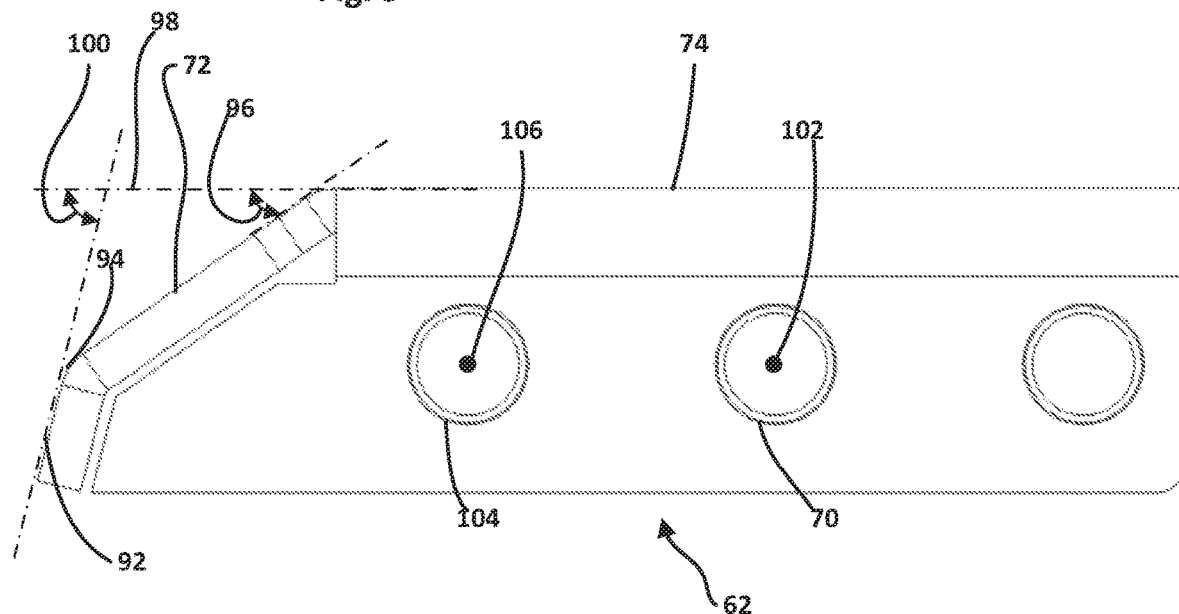
FIG. 10 is a side elevational view of an embodiment of the lift block depicted in FIG. 9.

As can be best appreciated in view of FIGS. 9 and 10, lift block 62 may further comprise angularly disposed surface 92 positioned at edge 94 of angularly disposed surface 72 opposite resting surface 74. In some of these embodiments, angularly disposed surface 72 comprises angle 96 relative to projection 98 of resting surface 74, angularly disposed surface 92 comprises angle 100 relative to projection 98 of resting surface 74, and angle 96 is less than angle 100. Since the angle of the surface 72 determines how sharply the wheel assembly 52 is lifted per unit length that the lift block is displaced, the angle of the surface 72 can be used to control both the applied force necessary to move the lift block 62 as well as the total displacement required of the lift block 62 to fully lift the assembly 52. It should be appreciated that other variations are also possible, e.g., more than two angularly disposed surfaces or a single uniform angularly disposed surface, and such variations fall within the scope of the claims below.

In some embodiments, pin 70 is positioned within slot 68. Pin 70 comprises longitudinal axis 102 which is parallel to axes of rotation 64 and 66. Lift block 62 may further comprise additional pins, e.g., pin 104, such that pin 70 and/or 104 is positioned within slot 68 or otherwise engagable against torque transfer plates for receiving force therefrom. In some of these embodiments, pins 70 and 104 comprise longitudinal axes 102 and 106, respectively. Longitudinal axes 102 and 106 are both parallel to axes of rotation 64 and 66. Pin 104 may be positioned between pin 70 and angularly disposed surface 72.

Moreover, the present disclosure further includes a bed comprising the foregoing lift mechanism. Bed 108 comprises frame 110, driven wheel assembly 52 and lift mechanism 50. Driven wheel assembly 52 and lift mechanism 50 are both secured to frame 110. In addition to driven wheel assembly 52, frame 110 may further comprise other wheel assemblies, e.g., unpowered wheels 112 positioned at a common elevation relative to each other, i.e., the plane depicted by dashed line 114, e.g., the floor. Driven wheel assembly 52 is positioned at common elevation 114 when in a lowered position and driven wheel assembly 52 is positioned elevationally higher than common elevation 114 when in a raised position. It should be appreciated that when in a lowered position, driven wheel assembly 52 may be used to assist with movement of bed 108 thereby permitting a care giver to more easily move a patient or to move a patient in bed 108 that would normally be precluded from doing so due to the weight of the patient and/or bed. Moreover, when in a raised position, wheel 53 of driven wheel assembly 52 does not contact the floor or surface upon which bed 108 is positioned and thereby driven wheel assembly 52 does not create any resistance to movement of bed 108 when no power is available for wheel assembly 52 or when it cannot otherwise provide any assistance with moving bed 108. In order to provide assistance with movement of bed 108, driven wheel assembly 52 may also comprise driving motor 116. Driving motor 116 provides rotational force for wheel 53 when powered, and provides resistance to rotation of wheel 53 when unpowered.

It should be appreciated that the various other embodiments of the present lift mechanism for a wheel disclosed herein may also be used individually or in various combinations with bed 108, and such variations fall within the scope of the claims For example, a single lift block may actuate one or more lift bearings, may actuate one or more wheels or wheel assemblies, or may be translated by one or more torque transfer plates. Additionally, any number of wheels or wheel assemblies may be included and actuated by the lift block(s). For example, two wheels 53 are included in the illustrated embodiments, which wheels 53 may be formed on the same wheel assembly, e.g., actuated by one or more lift blocks, or separate and independently actuatable wheel assemblies, e.g., each actuated by a different lift block.

Figure 11:
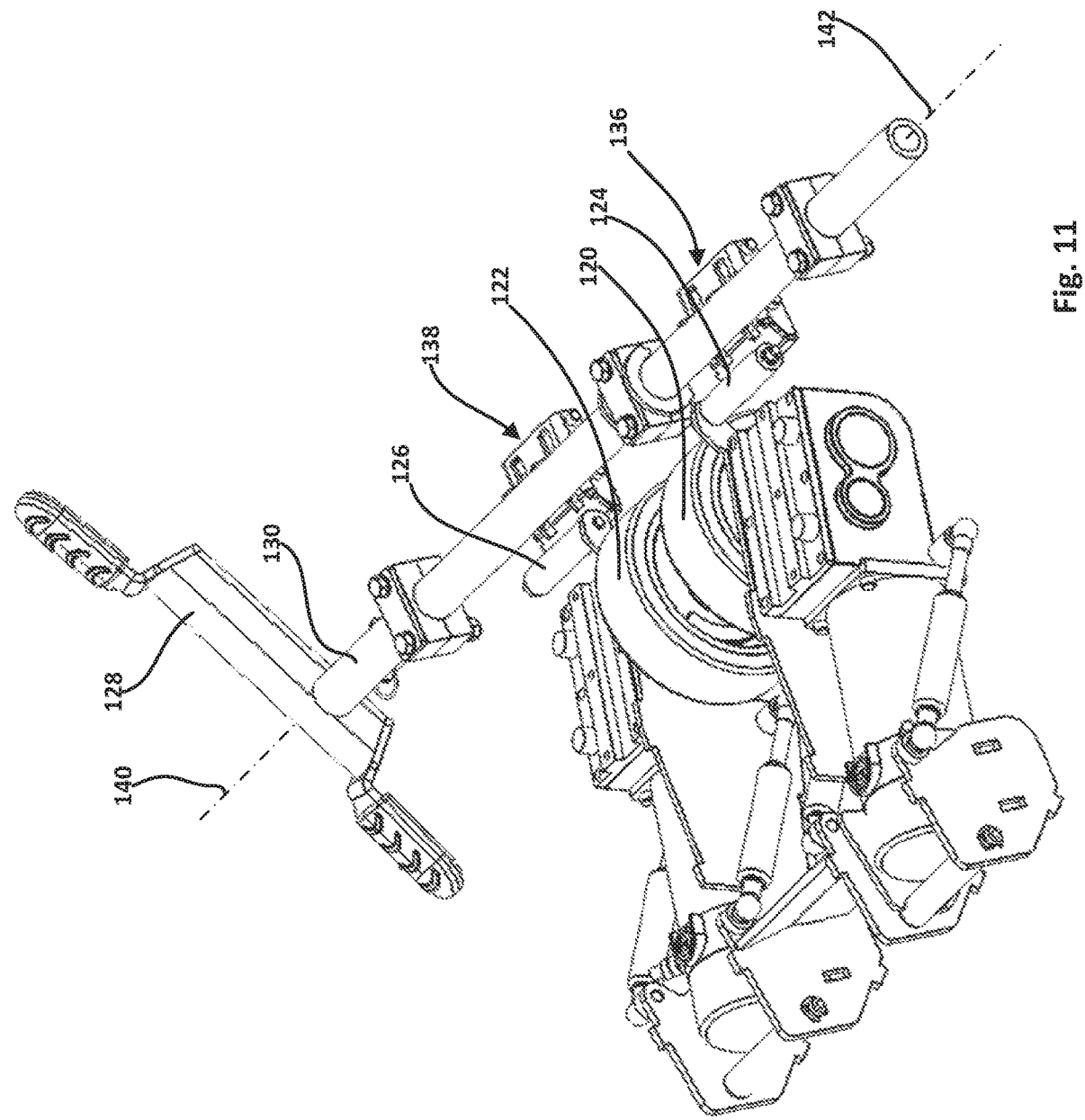
FIG. 11 is a top perspective view of an embodiment of a present lift mechanism with outer cover removed for clarity.
Figure 12:
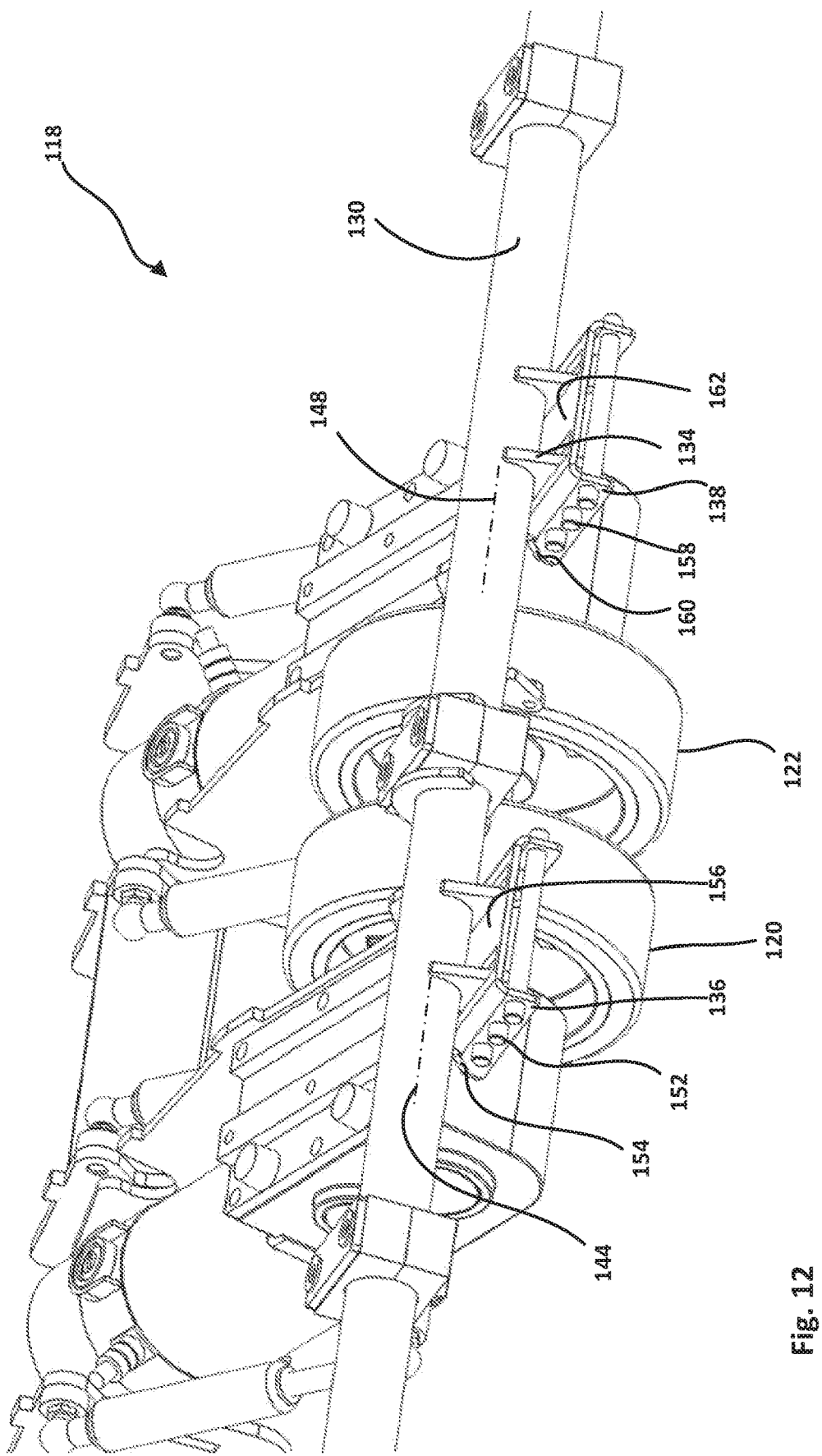
FIG. 12 is a top-rear perspective view of an embodiment of a present lift mechanism with outer cover removed for clarity.
Figure 13:
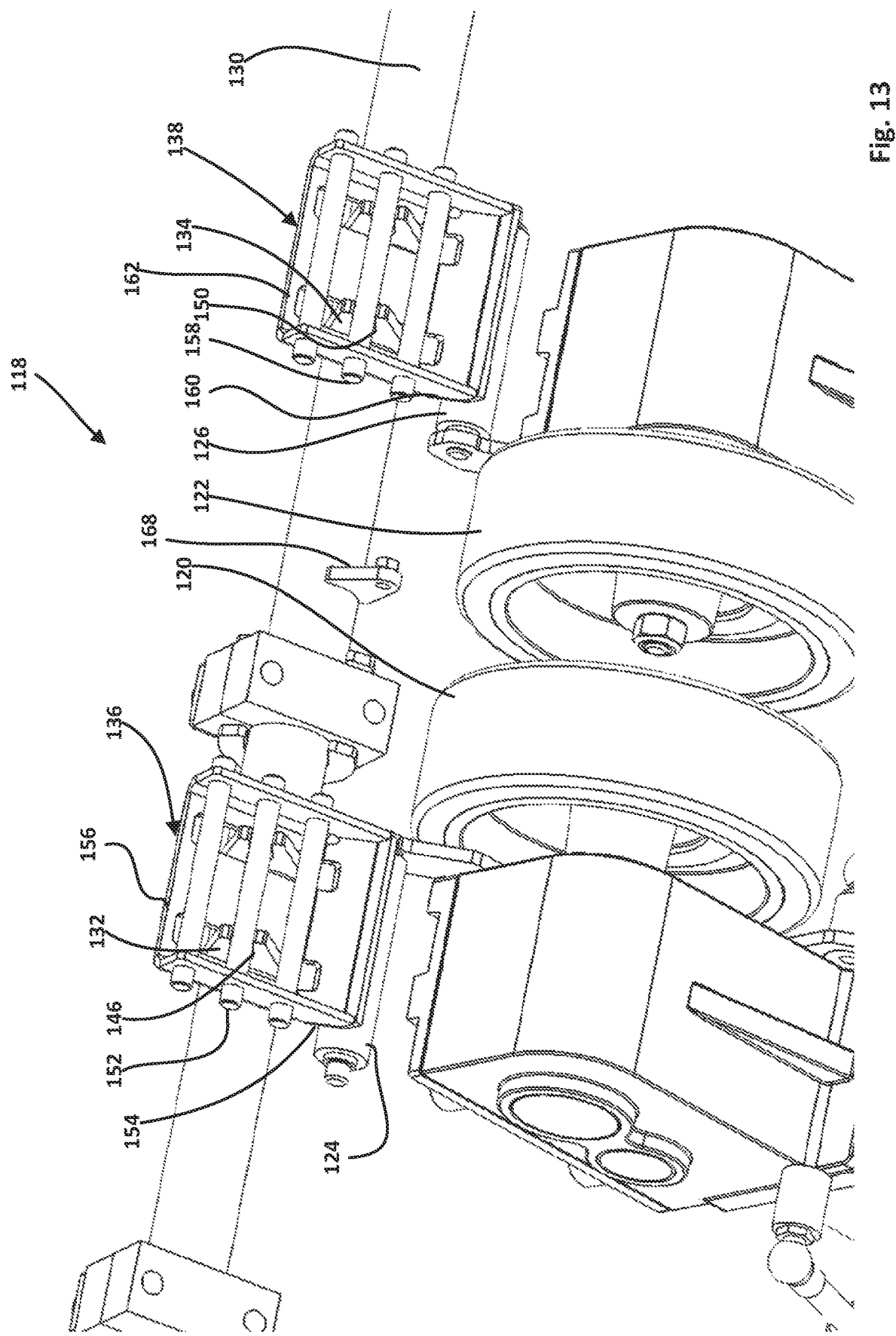
FIG. 13 is a bottom-rear perspective view of an embodiment of a present lift mechanism with outer cover removed for clarity.

For beds requiring more than a single driven wheel, the lift mechanisms according to the present disclosure may be configured to lift all driven wheels by the actuation of a single lever arm regardless of the number of torque transfer plates or lift blocks employed. An example embodiment of this arrangement in shown in FIGS. 11-13 which depicts a cross sectional view of a present lift mechanism. Lift mechanism 118 may be used to raise and lower driven wheel assemblies 120 and 122. Driven wheel assemblies 120 and 122 each generally resemble wheel assembly 52, comprising lift bearings 124 and 126, respectively. Likewise, lift mechanism 118 generally resembles lift mechanism 50, comprising lever arm 128, rotatable shaft 130, torque transfer plates 132 and 134 and lift blocks 136 and 138. Lever arm 128 comprises axis of rotation 140, while rotatable shaft 130 comprises longitudinal axis 142 coincident with axis of rotation 140. Rotatable shaft 130 is secured to lever arm 128. Torque transfer plate 132 comprises axis of rotation 144 and slot 146. Torque transfer plate 132 is secured to rotatable shaft 130. Torque transfer plate 134 comprises axis of rotation 148 and slot 150. Torque transfer plate 134 is secured to rotatable shaft 130. Lift block 136 comprises pin 152, angularly disposed surface 154 and resting surface 156 adjacent to angularly disposed surface 154. Similarly, lift block 138 comprises pin 158, angularly disposed surface 160 and resting surface 162 adjacent to angularly disposed surface 160. Axis of rotation 140 is coincident with second and third axes of rotation 144 and 148. Pins 152 and 158 are positioned within slots 146 and 150, respectively. Rotation of lever arm 128 causes rotation of torque transfer plates 132 and 134 via rotatable shaft 130. Rotation of torque transfer plates 132 and 134 cause linear motion of lift blocks 136 and 138, respectively. Wheels 120 and 122 are raised and lowered by contact between lift bearings 124 and 126 and lift blocks 136 and 138, respectively, as described above with respect to other embodiments.

Figure 14:
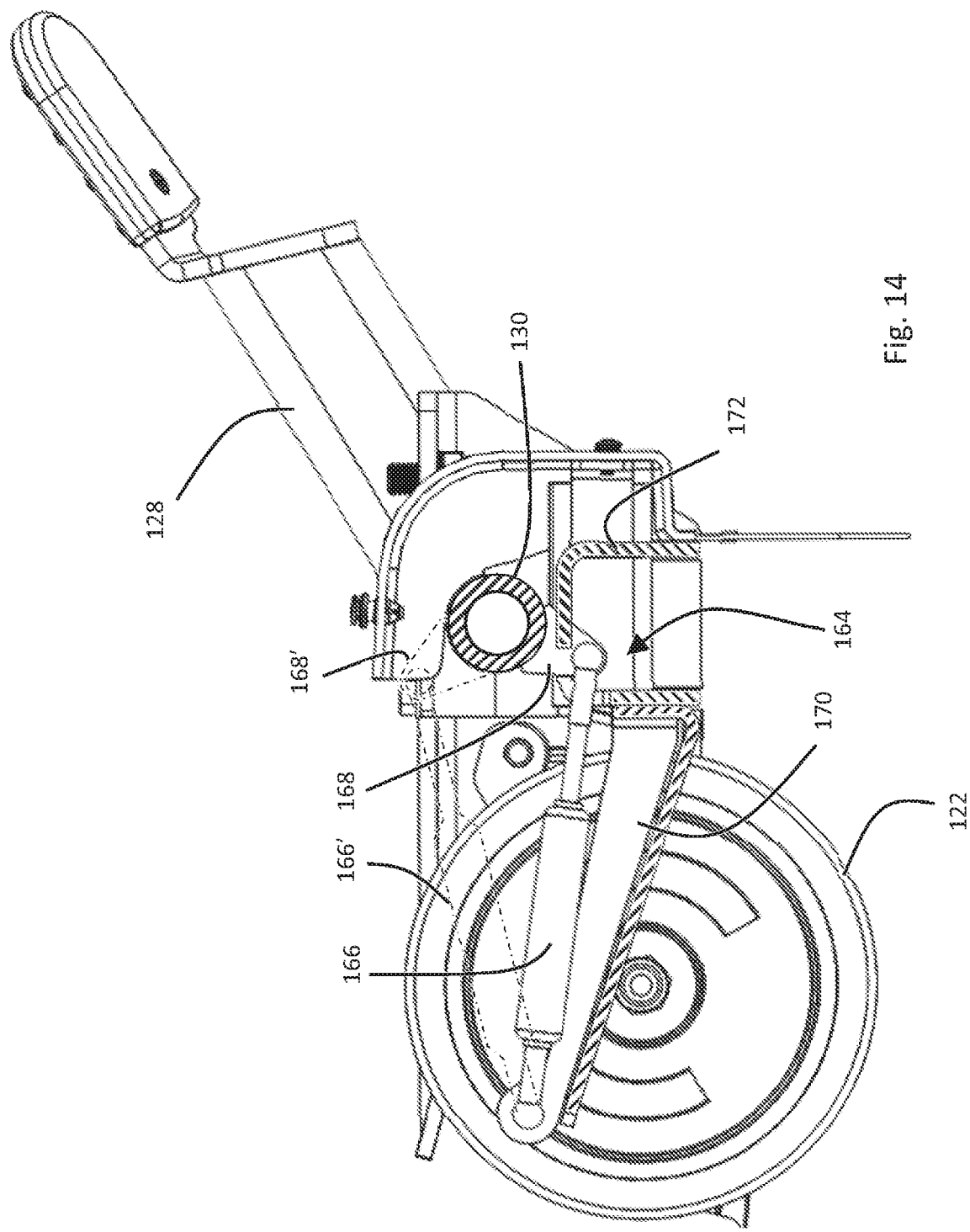
FIG. 14 is a side cross-sectional view of an embodiment of a present lift mechanism.

In one embodiment, best appreciated in FIG. 14, assembly 164 is included to bias and dampen lever arm 128 in when in the lifted and lowered positions. That is, assembly 164 includes biasing element 166 arranged to exert a force on lever arm 128 in order to resist rotation of lever arm 128, e.g., to prevent accidental lifting and/or lowering of the wheel assemblies discussed herein (e.g., due to the hospital bed or carrier being bumped, jostled, etc.). Biasing element 166 can be arranged as any device or mechanism arranged to resiliently exert a force against actuation of lever arm 128. In the illustrated embodiment, biasing element 166 takes the form of a gas spring, although it is to be appreciated that mechanical springs or other mechanisms may alternatively be used. Biasing element 166 is connected at one end to projection 168 that is secured to shaft 130, which is in turn connected to lever arm 128 as discussed above. In this way, biasing element 166 assists in resisting rotational movement of shaft 130 and thereby resists rotational movement, i.e., actuation, of lever arm 128. The opposite end of biasing element 168 is connected to support member 170, which is in turn connected to frame member 172 (e.g., which may form a part of the frame 110 discussed above, or other frame of a bed or other patient carrier). Phantom lines and reference numerals 166' and 168' are included to show the orientation of biasing element 166 and projection 168, respectively, when the lever arm 128 is rotated to its position opposite to that shown in FIG. 14. It is also noted that biasing assembly 164 and support frame member 172 are hidden in the other Figures for clarity of the other components, but that projection 168 is visible in FIG. 13, and therefore the location and arrangement of assembly 164 further appreciated in view of FIG. 13.

Moreover, the present disclosure sets forth a method of raising and lowering a wheel assembly. As described above, the wheel assembly comprises a lift bearing, and in an example embodiment, a lift mechanism comprises a lever arm, a torque transfer plate and a lift block. The lever arm comprises a first axis of rotation, a torque transfer plate comprises a second axis of rotation and a slot, and a lift block comprising a pin, an angularly disposed surface and a resting surface adjacent to the angularly disposed surface. The first axis of rotation is coincident with the second axis of rotation and the pin is positioned within the slot. An embodiment of a present method comprises: a) rotating the lever arm and the torque transfer plate attached to the lever arm about the first axis of rotation; b) linearly translating the lift block via an interaction between the torque transfer plate and the pin during rotation of the torque transfer plate; c) imparting an upwardly directed force on the lift bearing from the angularly disposed surface; and, d) raising the wheel via the upwardly directed force.

The present lift mechanism translates a care giver's force of stepping on a lever to lift power assisted wheels off the ground. The lift mechanism translates the downward force imparted by the care giver to an upward force on a wheel suspension arm via a lift bearing to lift the wheels. Thus, the present apparatuses use a horizontally biased inclined plane to transfer the force between the lever and the wheel. It has been found that the use of an inclined plane offers much higher lifting force while maintaining a low user input force. Additionally, a linearly actuated lift block having an included plane requires a relatively small amount of vertical space, which is advantageous for hospital beds, particular hospital beds that are vertically collapsible.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A lift mechanism for a wheel assembly, the lift mechanism comprising:
a lever arm comprising a first axis of rotation;
a first torque transfer plate comprising a second axis of rotation coincident with the first axis of rotation; and
a unitary lift block engageable by the first torque transfer plate, the lift block having a first angularly disposed surface and a resting surface adjacent to the first angularly disposed surface,
wherein the lift mechanism is configured such that rotation of the lever arm causes the first torque transfer plate to rotate into engagement with the lift block, thereby causing only linear motion of the lift block, and the wheel assembly is raised and lowered by contact between a portion of the wheel assembly and the first angularly disposed surface of the lift block and held in a raised position when the portion of the wheel assembly is positioned with respect to the resting surface, and wherein the first torque transfer plate is a torque transfer fork that comprises a slot and the lift block comprises a pin that is positioned within the slot.

2. The lift mechanism of claim 1, wherein the lever arm comprises a first end and a second end and the first axis of rotation is closer to the second end than to the first end.

3. The lift mechanism of claim 1, wherein the first torque transfer plate is integrally formed with the lever arm.

4. The lift mechanism of claim 1, wherein the first torque transfer plate comprises a first slot comprising an open end and a closed end and the open end is distal relative to the second axis of rotation.

5. The lift mechanism of claim 1, further comprising:
a second torque transfer plate comprising the second axis of rotation,
wherein rotation of the lever arm causes the first and second torque transfer plates to rotate into engagement with the lift block, thereby causing linear motion of the lift block.

6. The lift mechanism of claim 1, wherein the lift block further comprises a second angularly disposed surface positioned at an edge of the first angularly disposed surface opposite the resting surface.

7. The lift mechanism of claim 6, wherein the first angularly disposed surface comprises a first angle relative to a projection of the resting surface, the second angularly disposed surface comprises a second angle relative to a projection of the resting surface, and the first angle is less than the second angle.

8. The lift mechanism of claim 1, wherein the pin comprises a first longitudinal axis parallel to the first and second axes of rotation.

9. A bed comprising:
a frame;
a driven wheel secured to the frame and comprising a lift bearing; and
a lift mechanism secured to the frame and comprising:
a lever arm comprising a first axis of rotation;
a first torque transfer plate comprising a second axis of rotation coincident with the first axis of rotation; and
a unitary lift block comprising a first pin engageable by the first torque transfer plate, a first angularly disposed surface and a resting surface adjacent to the first angularly disposed surface,
wherein the lift mechanism is configured such that rotation of the lever arm causes the first torque transfer plate to rotate into engagement with the first pin, thereby causing only linear motion of the lift block, and the wheel is raised and lowered by contact between the lift bearing and the first angularly disposed surface of the lift block, and
wherein the first torque transfer plate is a torque transfer fork that comprises a slot and the first pin of the lift block is positioned within the slot.

10. The bed of claim 9, wherein the frame further comprises at least three wheel assemblies positioned at a common elevation relative to each other.

11. The bed of claim 10, wherein the driven wheel is positioned at the common elevation when in a lowered position and the driven wheel is positioned elevationally higher than the common elevation when in a raised position.

12. The bed of claim 9, wherein the driven wheel further comprises a driving motor.

13. The bed of claim 9, further comprising:
a second torque transfer plate comprising the second axis of rotation, wherein rotation of the lever arm causes rotation of the first and second torque transfer plates to rotate into engagement with the first pin, thereby causing linear motion of the lift block.

14. The bed of claim 9, wherein the lift block further comprises a second angularly disposed surface positioned at an edge of the first angularly disposed surface opposite the resting surface.

15. The bed of claim 14, wherein the first angularly disposed surface comprises a first angle relative to a projection of the resting surface, the second angularly disposed surface comprises a second angle relative to a projection of the resting surface, and the first angle is less than the second angle.

16. A bed comprising:
a frame;
a first driven wheel secured to the frame and comprising a first lift bearing;
a second driven wheel secured to the frame and comprising a second lift bearing; and
a lift mechanism secured to the frame and comprising:
 a lever arm comprising a first axis of rotation;
 a rotatable shaft comprising a longitudinal axis coincident with the first axis of rotation, the rotatable shaft is secured to the lever arm;
 a first torque transfer plate comprising a second axis of rotation coincident with the first axis of rotation, the first torque transfer plate is secured to the rotatable shaft;
 a second torque transfer plate comprising a third axis of rotation coincident with the first axis of rotation, the second torque transfer plate is secured to the rotatable shaft;
 a first unitary lift block comprising a first pin engageable by the first torque transfer plate, a first angularly disposed surface and a first resting surface adjacent to the first angularly disposed surface; and
 a second unitary lift block comprising a second pin engageable by the second torque transfer plate, a second angularly disposed surface and a second resting surface adjacent to the second angularly disposed surface,
wherein the lift mechanism is configured such that rotation of the lever arm causes the first and second torque transfer plates to rotate into engagement with the first pin and the second pin, respectively, thereby causing only linear motion of the first and second lift blocks, respectively, the first and second wheels raised and lowered by contact between the first lift bearing and the first angularly disposed surface of the first lift block and the second lift bearing and the second angularly disposed surface of the second lift block, respectively, and
wherein the first torque transfer plate is a first torque transfer fork that comprises a first slot and the first pin of the first lift block is positioned within the first slot and the second torque transfer plate is a second torque transfer fork that comprises a second slot and the second pin of the second lift block is positioned within the second slot.

\* \* \* \* \*